United States Patent
Abughaida et al.

(10) Patent No.: US 9,827,816 B2
(45) Date of Patent: Nov. 28, 2017

(54) METHODS AND SYSTEMS FOR ESTIMATING TIRE TREAD TEMPERATURE

(71) Applicant: GM GLOBAL TECHNOLOGY OPERATIONS LLC, Detroit, MI (US)

(72) Inventors: Amer Abughaida, Ann Arbor, MI (US); Youssef A. Ghoneim, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 872 days.

(21) Appl. No.: 14/246,738

(22) Filed: Apr. 7, 2014

(65) Prior Publication Data

US 2015/0283869 A1  Oct. 8, 2015

(51) Int. Cl.
| | | |
|---|---|---|
| *G01K 1/00* | (2006.01) | |
| *B60C 23/20* | (2006.01) | |
| *G01K 13/00* | (2006.01) | |
| *G01M 17/02* | (2006.01) | |
| *G01K 7/42* | (2006.01) | |
| *B60C 23/04* | (2006.01) | |
| *G06F 11/30* | (2006.01) | |

(52) U.S. Cl.
CPC .......... *B60C 23/20* (2013.01); *B60C 23/0408* (2013.01); *G01K 7/427* (2013.01); *G01K 13/00* (2013.01); *G01M 17/02* (2013.01); *G01K 2205/00* (2013.01)

(58) Field of Classification Search
CPC ..................................................... B60C 23/20
See application file for complete search history.

(56) References Cited

U.S. PATENT DOCUMENTS

| 7,320,246 B2 * | 1/2008 | Schick ................. B60C 11/24 |
| | | 702/188 |
| 2006/0250227 A1 * | 11/2006 | Naito ................. B60C 23/0408 |
| | | 340/447 |

* cited by examiner

*Primary Examiner* — Phuong Huynh
(74) *Attorney, Agent, or Firm* — Lorenz & Kopf, LLP

(57) ABSTRACT

Methods and systems are provided for estimating a temperature of a tire. The method includes: receiving tire pressure data; and estimating a temperature of a tread of the tire based on the tire pressure data.

18 Claims, 3 Drawing Sheets

METHODS AND SYSTEMS FOR ESTIMATING TIRE TREAD TEMPERATURE

TECHNICAL FIELD

The present disclosure generally relates to vehicles, and more particularly relates to methods and systems for estimating a temperature of a tire.

BACKGROUND

Generally, vehicle control systems determine tire temperature based on sensors mounted on the inside of the rim of the tire. Due to friction and other conditions, the temperature of the tire near the rim is different than the temperature of the tire on or near the tread of the tire. Knowing the actual tire temperature aids in predicting the forces generated by the tire which is used to maximize performance of the tire.

Accordingly, it is desirable to provide improved methods and systems for determining the tire temperature. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for estimating a temperature of a tire. In one embodiment, a method includes: receiving tire pressure data; and estimating a temperature of a tread of the tire based on the tire pressure data.

In another embodiment, a system includes a tire pressure sensor that generates tire pressure sensor data. A control module receives the tire pressure sensor data, and estimates a temperature of a tread of the tire based on the tire pressure data.

DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
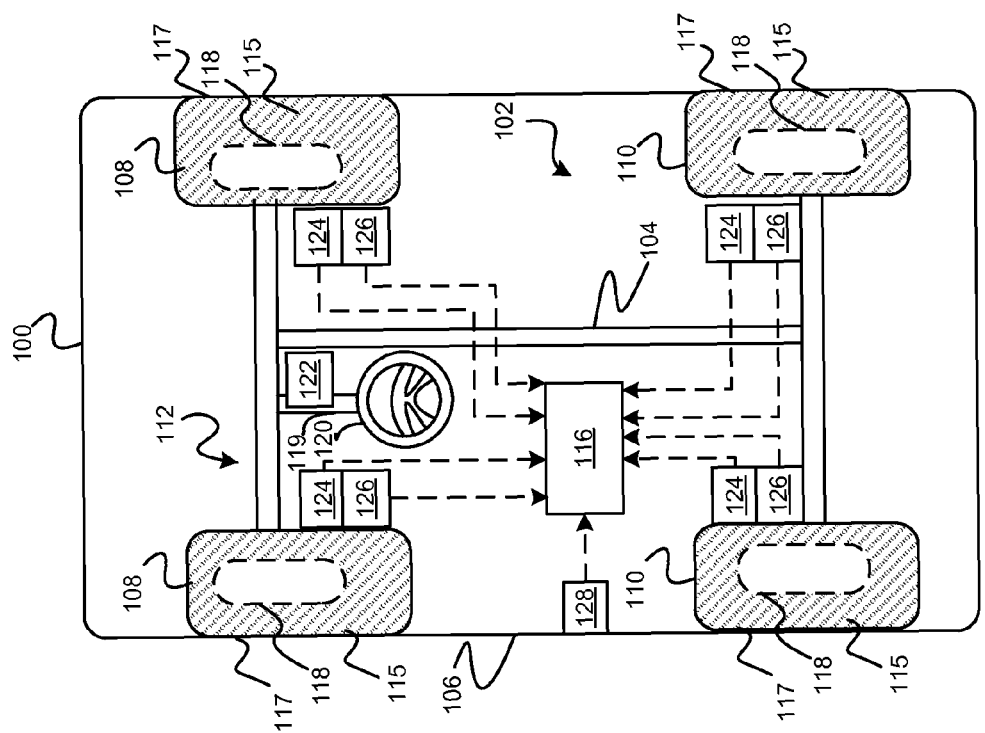
FIG. 1 is a functional block diagram of a vehicle that includes, among other features, a tire temperature estimation system in accordance with various embodiments.

With reference to FIG. 1, a vehicle 100 is shown that includes a tire temperature estimation system 102 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, and a control module 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106. The wheels 108-110 include tires 117 coupled to rims 118, respectively. A tread 115 of the tires 117 includes an exterior portion of the tires 117 that contacts a driving surface.

As can be appreciated, the vehicle 100 may be any one of a number of different types of vehicle, and may be two-wheel drive (2 WD) (i.e., rear-wheel drive or front-wheel drive), four-wheel drive (4 WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The steering system 112 includes a steering column 119 and a steering wheel 120. In various embodiments, the steering system 112 is an Electric Power Steering system (EPS) that includes a motor 122 that is coupled to the steering system 112, and that provides torque or force to a rotatable or translational member of the steering system 112. The steering system 112 in turn influences the steerable front road wheels 108 during steering based upon the assist torque received from the motor 122 along with any torque received from a driver of the vehicle 100 via the steering wheel 120.

The vehicle 100 further includes various sensors that sense observable conditions of the vehicle 100. For example, tire pressure sensors 124 sense an air pressure within the tires 117 of the vehicle 100. In another example, tire temperature sensors 126 sense a temperature of the tire 117 near the rim 118. In still another example, an ambient air temperature sensor 128 senses a temperature of the ambient air. The sensors 124, 126, 128 generate sensor signals based on the sensed observable conditions. The control module 116 receives the sensor signals and, among other things, estimates a temperature of the treads 115 of the tire 117 (hereinafter referred to as the tire tread temperature). The control module 116 uses the estimation of the tire tread temperature to estimate other values (e.g., forces of the tire 117) or to control features of the vehicle 100.

In general, the control module 116 estimates the tire tread temperature based on the ideal gas law:

$$P_a V = nRT_a, \quad (1)$$

where ($P_a$) represents the absolute pressure of the gas in PSI, (V) represents the volume of the gas, (R) represents the gas constant of air, ($T_a$) represents the absolute temperature of the gas in °C., and (n) represents the mass of air in the tire. For example, the ideal gas law can be rewritten as:

$$\gamma = \frac{nR}{V} = \frac{P}{T}. \quad (2)$$

In changing the absolute value of the pressure to a sensed value, 14.7 PSI is added which is the atmospheric pressure at sea level. Similarly, in changing the temperature to a sensed value, 273 is added which is the difference between absolute zero and zero degrees centigrade. Solving the equation for gamma (γ) and adding these values in provides:

$$\gamma = \frac{P+14.7}{T+273}. \quad (3)$$

Gamma can then be determined using the sensed tire pressure. By using a last known value of gamma, the tire tread temperature ($T_t$) can be estimated as:

$$T_t = \frac{P+14.7}{\gamma} - 273. \quad (4)$$

Figure 2:
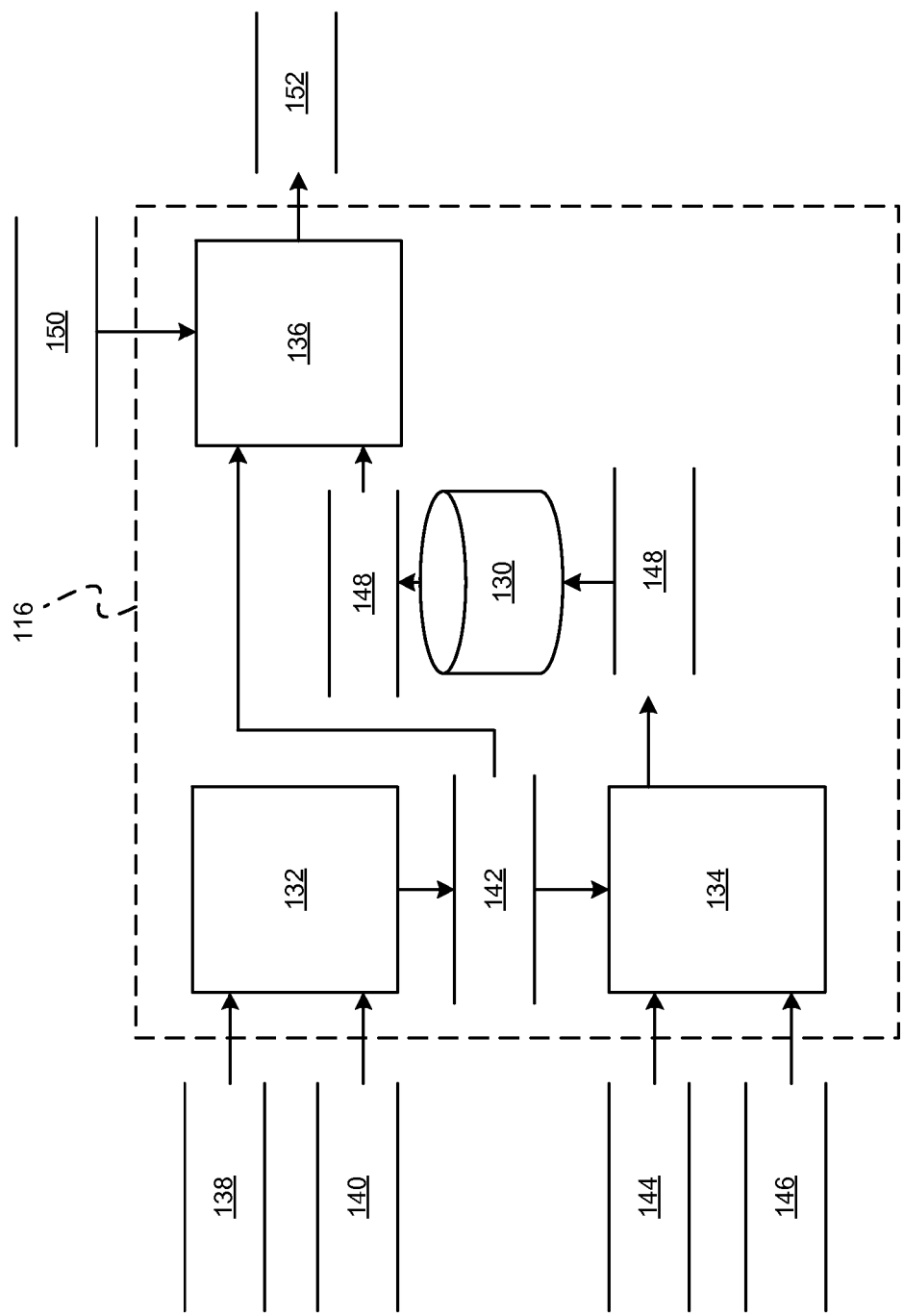
FIG. 2 is a functional block diagram of a control module of the tire temperature estimation system in accordance with various embodiments.

Referring now to FIG. 2 and with continued reference to FIG. 1, a dataflow diagram illustrates the control module 116 of FIG. 1 in accordance with various embodiments. As can be appreciated, various embodiments of the control module 116, according to the present disclosure, may include any number of sub-modules. For example, the sub-modules shown in FIG. 2 may be combined and/or further partitioned to similarly estimate the tire tread temperature. As discussed above, inputs to the control module 116 may be received from the sensors 124-128, received from other control modules (not shown) within the vehicle 100, and/or determined by sub-modules (not shown) within the control module 116. In various embodiments, the control module 116 includes a gamma datastore 130, a temperature evaluation module 132, a gamma determination module 134, and a tire tread temperature estimation module 136.

The temperature evaluation module 132 receives as input tire temperature data 138 and ambient air temperature data 140. The tire temperature data 138 indicates a tire temperature; and the ambient air temperature data 140 indicates an ambient air temperature. Based on the data 138, 140, the temperature evaluation module 132 computes an absolute value of a difference between the tire temperature and the ambient temperature. The temperature evaluation module 132 sets a status flag 142 based on the result. For example, if the absolute value of the difference is less than a threshold, then the status flag 142 is set to indicate the difference is low. In another example, if the absolute value of the difference is greater than or equal to the threshold, then the status flag 142 is set to indicate the difference is high.

The gamma determination module 134 receives as input the status flag 142, tire temperature data 144, and tire pressure data 146. The tire temperature data 144 indicates a tire temperature; and the tire pressure data 146 indicates a tire pressure. Based on the data 142-146, the gamma determination module 134 selectively computes a value for gamma 148. For example, when the status flag 142 indicates the absolute value of the difference is low, the gamma determination module 134 computes gamma 148 as:

$$\gamma = \frac{P+x}{T+y}, \quad (5)$$

where x and y can be 14.7 and 273, respectively (as described above), or any other numbers depending on the unit of pressure and temperature used. In this case, the gamma determination module 134 stores the computed value for gamma 148 in the gamma datastore 130 for future use. In another example, when the status flag 142 indicates the absolute value of the difference is high, the gamma determination module 134 does not compute and store a new value for gamma 148.

The tire tread temperature estimation module 136 receives as input the status flag 142, and tire pressure data 150. Based on the inputs 142, 150, the tire tread temperature estimation module 136 selectively computes a tire tread temperature 152. For example, when the status flag 142 indicates the absolute value of the difference is high, the tire tread temperature estimation module 136 reads the stored gamma 148 from the gamma datastore 130, and computes the tire tread temperature 152 as:

$$T_t = \frac{P+x}{\gamma} - y, \quad (6)$$

where x and y can be 14.7 and 273, respectively (as described above) or any other numbers depending on the unit of pressure and temperature used. In another example, when the status flag 142 indicates the absolute value of the difference is low, the tire tread temperature estimation module 136 does not compute the tire tread temperature 152.

Figure 3:
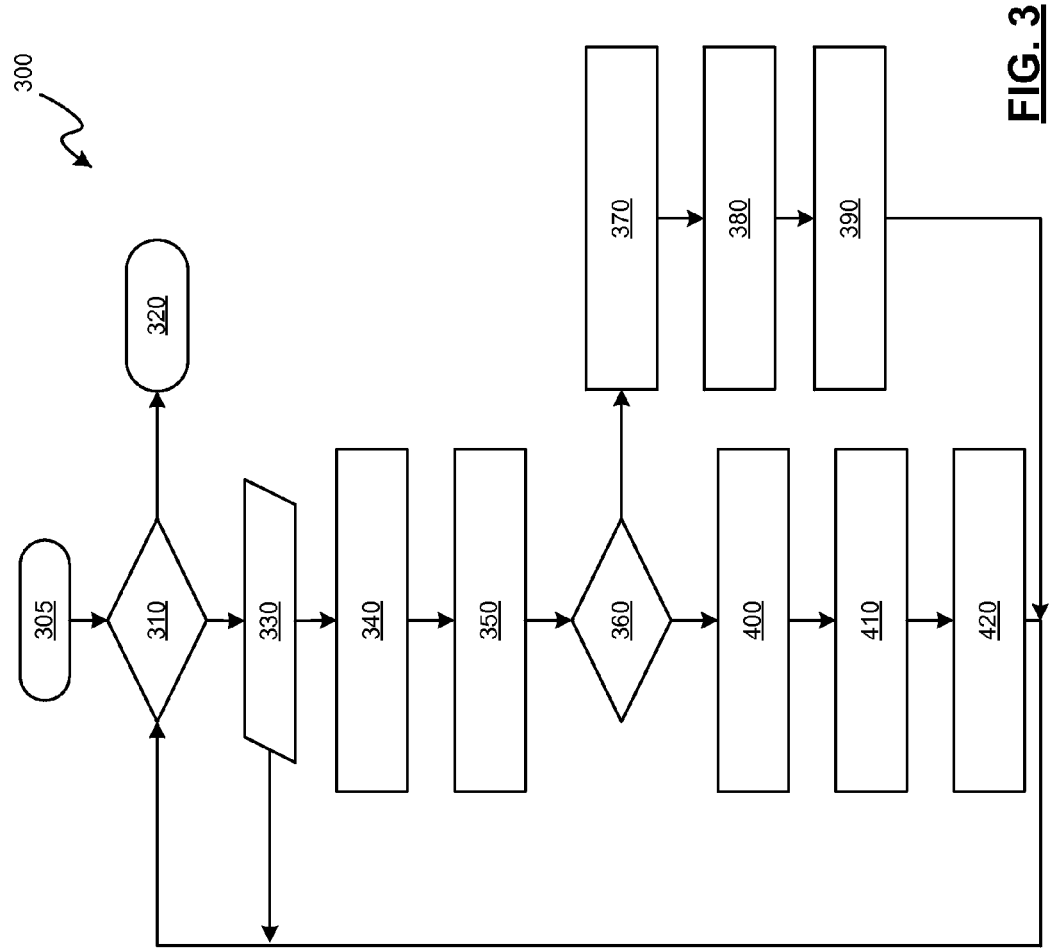
FIG. 3 is a flowchart of a method for estimating tire temperature in accordance with various embodiments.

With reference now to FIG. 3, a flowchart is shown of a method 300 for estimating tire tread temperature, in accordance with various exemplary embodiments. The method 300 can be implemented in connection with the vehicle 100 of FIG. 1 and can be performed by the control module 116 of FIG. 2, in accordance with various exemplary embodiments. As can be appreciated in light of the disclosure, the order of operation within the method is not limited to the sequential execution as illustrated in FIG. 3, but may be performed in one or more varying orders as applicable and in accordance with the present disclosure. As can further be appreciated, the method of FIG. 3 may be scheduled to run at predetermined time intervals during operation of the vehicle 100 and/or may be scheduled to run based on predetermined events.

As depicted in FIG. 3, the method may begin at 305. It is determined whether the ignition is on at 310. If the ignition is not on at 310, the method may end at 320.

If, however, the ignition is on at 310, the tire tread temperature ($T_{ti}$) is computed for each tire i at 330-390. In particular, the tire temperature data 138 is received that indicates the tire temperature ($T_i$) at 340, and the ambient air temperature data 140 is received that indicates the ambient air temperature ($T_a$) at 350. The temperature signals ($T_i$) and ($T_a$) are evaluated at 360. If the absolute value of the difference between the tire temperature at the rim ($T_i$) and the ambient air temperature ($T_a$) exceeds a threshold $|T_i - T_a| \geq \epsilon_i$ at 360, the tire pressure data 146 is received that indicates the tire pressure ($P_i$) at 370. The value of gamma ($\gamma_i$) is computed at 380 as:

$$\gamma_i = \frac{P_i + x}{T_a + y}. \quad (7)$$

The value of gamma ($\gamma_i$) is stored in the gamma datastore 130 at 390. Thereafter, the method continues with evaluating whether the ignition is still on at 310.

If, at 360, the absolute value of the difference between the tire temperature at the rim ($T_i$) and the ambient air temperature ($T_a$) is less than the threshold ($|T_i-T_a|\le\epsilon_i$), the tire pressure data 150 is received that indicates the tire pressure ($P_i$) at 400, and the stored value of gamma ($\gamma_i$) is read at 410. Thereafter, the tire tread temperature ($T_{ti}$) is computed as:

$$T_{ti} = \frac{P_i + x}{\gamma_i} - y. \qquad (8)$$

Thereafter, the method continues with evaluating whether the ignition is still on at 310.

As can be appreciated, the disclosed methods and systems may vary from those depicted in the Figures and described herein. For example, as mentioned above, the vehicle 100 of FIG. 1, and the control module 116 of FIGS. 1 and 2, and/or portions and/or components thereof may vary, and/or may be disposed in whole or in part in any one or more of a number of different vehicle units, devices, and/or systems, in certain embodiments. In addition, it will be appreciated that certain steps of the method 300 may vary from those depicted in FIG. 3 and/or described above in connection therewith. It will similarly be appreciated that certain steps of the method 300 may occur simultaneously or in a different order than that depicted in FIG. 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of estimating a temperature of a tire, the method comprising:
   receiving tire pressure data; and
   computing a first value based on the tire pressure data;
   receiving subsequent tire pressure data;
   computing a second value based on the first value and the subsequent tire pressure data, and
   estimating a temperature of a tread of the tire based on the second value.

2. The method of claim 1, further comprising:
   receiving ambient air temperature data that indicates an ambient air temperature;
   receiving tire temperature data that indicates a tire temperature; and
   wherein the estimating the temperature of the tire tread is based on the ambient air temperature and the tire temperature.

3. The method of claim 1, further comprising computing an absolute value of a difference between the ambient air temperature and the tire temperature, and wherein the estimating the temperature of the tire tread is based on an evaluation of the absolute value of the difference.

4. The method of claim 1, wherein the computing the first value is based on:

$$\gamma = \frac{P + x}{T + y},$$

where (P) is the tire pressure, (T) is the tire temperature, (x) is a constant value, and (y) is a constant value.

5. The method of claim 4, wherein (x) is based on a unit of pressure.

6. The method of claim 4, wherein (y) is predefined based on a unit of temperature.

7. The method of claim 1, wherein the computing the second value is based on:

$$T_t = \frac{P + x}{\gamma} - y,$$

where (P) is the tire pressure, ($\gamma$) is the first value, x is a constant value, and y is a constant value.

8. The method of claim 7, wherein (x) is predefined based on a unit of pressure.

9. The method of claim 7, wherein (y) is predefined based on a unit of temperature.

10. A system for estimating a temperature of a tire, comprising:
    a tire pressure sensor that generates tire pressure sensor data; and
    a control module that receives the tire pressure sensor data, computes a first value based on the tire pressure data, receives subsequent tire pressure data, computes a second value based on the first value and the subsequent tire pressure data, and estimates a temperature of a tread of the tire based on the second value.

11. The system of claim 10, wherein the control module:
    receives ambient air temperature data that indicates an ambient air temperature;
    receives tire temperature data that indicates a tire temperature; and
    wherein the control module estimates the temperature of the tire tread based on the ambient air temperature and the tire temperature.

12. The system of claim 10, wherein the control module computes an absolute value of a difference between the ambient air temperature and the tire temperature, and estimates the temperature of the tire tread based on an evaluation of the absolute value of the difference.

13. The system of claim 10, wherein the control module computes the first value based on:

$$\gamma = \frac{P + x}{T + y},$$

where (P) is the tire pressure, (T) is the tire temperature, (x) is a constant value, and (y) is a constant value.

14. The system of claim 13, wherein (x) is predefined based on a unit of pressure.

15. The system of claim 13, wherein (y) is predefined based on a unit of temperature.

16. The system of claim 10, wherein the control module computes the second value based on:

$$T_t = \frac{P+x}{\gamma} - y,$$

where (P) is the tire pressure, (γ) is the first value, x is a constant value, and y is a constant value.

17. The system of claim 16, wherein (x) is predefined based on a unit of pressure.

18. The system of claim 16, wherein (y) is predefined based on a unit of temperature.

\* \* \* \* \*